US009037107B2

(12) United States Patent
Huang et al.

(10) Patent No.: US 9,037,107 B2
(45) Date of Patent: May 19, 2015

(54) COMMUNICATION DEVICE WITH IMPROVED INTERFERENCE REJECTION AND A METHOD THEROF

(71) Applicant: Stichting IMEC Nederland, Eindhoven (NL)

(72) Inventors: Xiongchuan Huang, Eindhoven (NL); Ruben De Francisco Martin, Utrecht (NL); Guido Dolmans, Son en Breugel (NL)

(73) Assignee: Stichting IMEC Nederland, Eindhoven (NL)

( * ) Notice: Subject to any disclaimer, the term of this patent is extended or adjusted under 35 U.S.C. 154(b) by 186 days.

(21) Appl. No.: 13/679,975

(22) Filed: Nov. 16, 2012

(65) Prior Publication Data

US 2013/0143501 A1 Jun. 6, 2013

Related U.S. Application Data

(60) Provisional application No. 61/577,571, filed on Dec. 19, 2011.

(30) Foreign Application Priority Data

Nov. 18, 2011 (EP) .................................... 11189850

(51) Int. Cl.
*H04B 1/26* (2006.01)
*H04B 15/00* (2006.01)
(Continued)

(52) U.S. Cl.
CPC .............. *H04B 15/00* (2013.01); *H04B 1/0475* (2013.01); *H04B 1/0483* (2013.01); *H04B 13/005* (2013.01); *H04L 27/2647* (2013.01)

(58) Field of Classification Search
CPC .............................. H04B 1/0483; H04B 15/00

USPC ........ 455/130, 20, 307, 701, 702, 278.1, 296, 455/343.1, 131, 190.1, 313; 375/316, 343, 375/346, 348

See application file for complete search history.

(56) References Cited

U.S. PATENT DOCUMENTS 6,385,261 B1    5/2002  Tsuji et al.
6,606,484 B1 *  8/2003  Faulkner ....................... 455/131

(Continued)

FOREIGN PATENT DOCUMENTS

JP          1273463         11/1989

OTHER PUBLICATIONS

Daly et al., "An Energy-Efficient OOK Transceiver for Wireless Sensor Networks", Radio Frequency Integrated Circuits (RFIC) Symposium, 2006 IEEE, IEEE, Piscataway, NJ, USA, Jun. 11, 2006, pp. 245-248.

(Continued)

*Primary Examiner* — Sonny Trinh
(74) *Attorney, Agent, or Firm* — Knobbe Martens Olson & Bear LLP

(57) ABSTRACT

A communication device is disclosed. The device may be in particular a radio transmitter and a receiver that can operate with low power consumption and with improved interference rejection, therefore particularly suitable for use in low-power communication systems, such as wireless sensor networks and wireless body area networks. In one aspect, multiple frequency tones (carriers) are used to carry information from the transmitter, such that a RF signal having multiple radio frequency components is produced and transmitted. In the receiver, an envelope detector is still the RF down-converter. After down-converting intermodulation components are extracted containing amplitude, phase and frequency information of the multiple radio frequency components. This allows the desired signal (the baseband information) to be distinguished from the carriers and unwanted interference.

17 Claims, 7 Drawing Sheets

(51) Int. Cl.
*H04B 1/04* (2006.01)
*H04B 13/00* (2006.01)
*H04L 27/26* (2006.01)

(56) References Cited

U.S. PATENT DOCUMENTS

| | | | | |
|---|---|---|---|---|
| 7,548,726 | B1 * | 6/2009 | Rofougaran | 455/20 |
| 8,116,677 | B2 * | 2/2012 | Rofougaran et al. | 455/20 |
| 8,433,008 | B2 * | 4/2013 | Kumar | 375/343 |
| 2005/0107049 | A1 | 5/2005 | Albert et al. | |
| 2008/0108318 | A1 | 5/2008 | Min et al. | |
| 2010/0216523 | A1 | 8/2010 | Sebastiano et al. | |

OTHER PUBLICATIONS

Demirkol et al., "Wake-Up Receivers for Wireless Sensor Networks: Benefits and Challenges", IEEE Wireless Communication, vol. 16, No. 4, Aug. 2009.

Durante et al., "An ultra low power Wakeup Receiver for Wireless Sensor Nodes", IEEE Computer Society, 2009 Third International Conference on Sensor Technologies and Applications, 2009.

Pletcher, "Ultra-Low Power Wake-Up Receivers for Wireless Sensor Networks" PhD thesis, University of California, Berkeley, 2008.

Barragán et al., "Alternate test of LNAs through ensemble learning of on-chip digital envelope signatures", Journal of Electronic Testing: Theory and Applications, vol. 27, No. 3, Jun. 2011, pp. 277-288.

Gu et al., "Low Power Transmitter Design for BAN", Biomedical Circuits and Systems Conference, 2007. BIOCAS 2007. IEEE, IEEE, Piscataway, NJ, USA, Nov. 27, 2007, pp. 175-178.

Duperre et al., "RF receiver and transmitter for insect mounted sensor platform", Circuits and Systems, 2009. MWSCAS 2009. $52^{nd}$ IEEE International Midwest Symposium on, IEEE, Piscataway, NJ, USA, Aug. 2, 2009, pp. 264-267.

Extended European search report for European Patent Application No. 11189850.8 dated Jun. 6, 2012 by European Patent Office.

* cited by examiner

COMMUNICATION DEVICE WITH IMPROVED INTERFERENCE REJECTION AND A METHOD THEROF

CROSS REFERENCE TO RELATED APPLICATIONS

This application claims priority under 35 U.S.C. §119(e) to U.S. provisional patent application 61/577,571 filed on Dec. 19, 2011, which application is hereby incorporated by reference in its entirety.

TECHNICAL FIELD

The disclosed technology relates to a communication device, and in particular to a radio transmitter and a receiver that can operate with low power consumption and with improved interference rejection, therefore particularly suitable for use in low-power communication systems, such as wireless sensor networks and wireless body area networks.

DESCRIPTION OF THE RELATED TECHNOLOGY

Realization of low power wireless transceiver is one of the key challenges in low power wireless sensor network (WSN) and wireless body area network (WBAN) applications. In such applications, only limited energy resources are available. However, it is necessary to maintain long or unlimited operation time for the radio nodes while maintaining a reasonable performance. As such, low power consumption becomes one of the most important requirements.

With a stringent power consumption constraint, e.g. sub-mW, many radios have utilized amplitude modulation and envelope detection to eliminate the need for accurate, but power-hungry radio frequency (RF) generators and thus reducing the power consumption. FIG. 1 shows an architecture of a system 10, having a transmitter 12 and a receiver 14. The transmitter 12 has a baseband stage (BB) 20 for generating baseband signals, an up-conversion stage 22 for converting the baseband signals to a radio frequency (RF), and a transmit antenna 24. The receiver 14 has a receive antenna 40, a RF band-pass (BP) filter 42, a down-conversion stage 44 including an envelope detector, and a baseband processing stage 46 for handling the baseband output signal.

However, such architectures suffer from poor phase and frequency selectivity due to the use of envelope detector as down-converting means. During down-conversion only the amplitude information is extracted by the envelope detector while the carrier frequency and phase information are lost. Consequently, the receiver is unable to distinguish the carrier frequency of the input signal and thus making the receivers vulnerable to interferences. To improve interference rejections, the RF front-end filter 42 is added in the receiver chain before the envelope detector. However, due to the limited Q-factor, it is difficult to realize front-end filters with a narrowband width directly at radio frequency. As a consequence, in-band interference—the interference not filtered by the front-end filter—still corrupts the desired signal. Front-end filters in low-power radio receivers are only suitable for band selection and within the selected frequency band additional interference rejection technique is needed to select the desired signal and attenuate adjacent interference.

An energy-efficient transceiver for wireless sensor networks, described in Daly et al, "An Energy-Efficient OOK Transceiver for Wireless Sensor Networks", IEEE Journal of Solid-State Circuits, vol. 42, No. 5, May 2007, proposes an architecture using a surface acoustic wave (SAW) filter as a front-end filter for rejecting the out-of-band interference. However, typical bandwidth of SAW filter is more than 10 MHz around a central frequency, i.e. 900 MHz. However, the date-rate for OOK transmission is 200 kbps or lower, i.e. the channel bandwidth of such transceivers is of only 200 KHz. In-band interference within the 10 MHz front-end filter bandwidth will pass through and degrade the performance of the receiver.

SUMMARY OF CERTAIN ASPECTS

According to a first aspect of the present disclosure, there is provided a method for interference rejection in a communication system comprising a transmitter and a receiver, the method comprising a) in the transmitter, up-converting a baseband signal to a radio signal and transmitting the radio signal, b) in the receiver, receiving the radio signal, filtering the radio signal by a front-end filter for discarding out-of-band interference, and down-converting by an envelope detector, wherein c) in the transmitter, up-converting the baseband signal to the radio signal using at least two frequency tones, thereby modulating the baseband signal with the at least two frequency tones, producing a radio frequency signal to be transmitted comprising at least two frequency signals, and d) in the receiver, further down-converting the signal provided by the envelope detector, thereby demodulating the baseband signal using at least one frequency tone, the at least one frequency tone being related to the frequency offset of the at least two frequency signals, and filtering the baseband signal for discarding interference.

In some embodiments, the signal provided by the envelope detector comprises relative frequency information of the at least two frequency signals, thereby providing optimal interference rejection.

By up-converting the baseband signal with more than one frequency tones, the baseband information is encoded in the frequency offset (i.e. frequency difference) of these frequency tones. At the receiver side, after the envelope detector, not only the amplitude information as in conventional envelope detector radios is preserved, but also the phase and frequency information. By making use of this information, the desired signal (the baseband information) can be distinguished from unwanted interference thereby providing improved interference rejection. Furthermore, this allows for relaxing the filter requirements in the receiver.

The selection of the frequency offset is a trade-off problem between the performance and power consumption of the system. For example, if selected too high, the receiver consumes more power because the intermediate frequency stage needs to operate at higher frequency, and if too low, the system will suffer from wideband interference which has comparable bandwidth as the frequency offset. Thus, this selection of the frequency offset is defined by the specific application of the communication system.

In the transmitter, the up-converting of the baseband signal using at least two frequency tones may be a direct up-conversion of the baseband signal to radio frequency, wherein the at least two frequency tones are radio frequency tones, and wherein the frequency offset of the at least two frequency signals equals the frequency offset of the at least two radio frequency tones.

In the transmitter, the up-converting of the baseband signal using at least two frequency tones may be an indirect up-conversion of the baseband signal to radio frequency, wherein one of the at least two frequency tones is an intermediate frequency tone and the other is a radio frequency tone, and wherein the frequency offset of the at least two frequency signals equals twice the frequency of the intermediate frequency tone.

In the receiver, the down-converting of the signal provided by the envelope detector using at least one frequency tone may be an indirect down-conversion of the signal to baseband frequency, wherein the at least one frequency tone is an intermediate frequency tone.

In the transmitter, the direct up-conversion of the baseband signal to radio frequency may comprise a) generating at least two radio frequency tones, at least a first radio frequency tone and a second radio frequency tone, b) up-converting the baseband signal using the first radio frequency tone and the second radio frequency tone, thereby generating at least two radio frequency signals, and c) adding the at least two radio frequency signals, thereby generating the radio signal to be transmitted.

In the transmitter, the indirect up-conversion of the baseband signal to radio frequency may comprise a) generating at least one intermediate frequency tone; b) up-converting the baseband signal using the at least one intermediate frequency tone, thereby generating at least one intermediate frequency signal, c) generating a radio frequency tone; and d) up-converting the at least one intermediate frequency signal using the radio frequency tone, thereby generating the radio signal to be transmitted comprising at least two radio frequency signals.

In one embodiment, the up-conversion of the baseband signal to intermediate frequencies is performed in digital domain.

In the receiver, the indirect down-conversion of the signal provided by the envelope detector to baseband frequency may comprise a) generating at least one intermediate frequency tone; and b) down-converting the signal provided by the envelope detector using the at least one intermediate frequency tone, thereby extracting the baseband signal.

In another embodiment, in the receiver, the down-conversion of the signal provided by the envelope detector to baseband frequency comprises digitizing the signal provided by the envelope detector and down-converting the digitized signal to a digital baseband signal.

According to a second aspect of the present disclosure, there is provided a transmitter, comprising an up-converting stage, for up-converting a baseband signal to a radio signal to be transmitted, wherein, the up-converting stage comprises at least two up-conversion modules for up-converting the baseband signal with at least two frequency tones, thereby producing a radio signal to be transmitted comprising at least two frequency signals.

In one embodiment, the up-converting stage may perform a direct up-conversion of the baseband signal to radio frequency, wherein the up-converting stage comprises the at least two up-conversion modules arranged in parallel, wherein each of the at least two up-conversion modules comprises a) a radio frequency generator, for generating a radio frequency tone, b) an up-converting means, for up-converting the baseband signal with the radio frequency tone, thereby generating a radio frequency signal; and c) means for adding the generated radio frequency signals of the at least two up-conversion modules, to form the radio signal to be transmitted.

In another embodiment, the up-converting stage may perform an indirect up-conversion of the baseband signal to radio frequency, wherein the up-converting stage comprises the at least two up-conversion modules arranged in series, wherein one of the at least two up-conversion modules is an intermediate up-conversion module comprising an intermediate frequency generator, for generating an intermediate frequency tone, and an up-converting means, for up-converting the baseband signal with the intermediate frequency tone, thereby generating an intermediate frequency signal. The other is a final up-conversion module comprising a radio frequency generator, for generating a radio frequency tone, and a final up-converting means, for further up-converting the intermediate frequency signal to the radio signal to be transmitted comprising at least two radio frequency signals.

In another embodiment, the up-converting stage may perform an indirect up-conversion of the baseband signal to radio frequency, wherein the up-converting stage comprises the at least two up-conversion modules arranged in series, wherein one of the at least two up-conversion modules is a digital intermediate up-conversion module, arranged for receiving the baseband signal and generating a digital intermediate frequency signal. The other up-conversion module is a final up-conversion module comprising a) an radio frequency generator for generating a radio frequency tone, and b) an amplifier, for receiving the radio frequency tone at a first input and for receiving the digital intermediate frequency signal at a second input, thereby generating the radio signal to be transmitted comprising at least two radio frequency signals.

According to a third aspect of the present disclosure, there is provided a receiver, comprising means for receiving a radio signal, the radio signal being a baseband signal modulated with at least two frequency tones, a filtering means for filtering the radio signal, thereby discarding out-of-band interference; and a down-converting stage, for down-converting the radio signal to a baseband signal, the down-converting stage comprising an envelope detector; wherein, the down-converting stage further comprises at least one intermediate down-conversion module for down-converting the signal provided by the envelope detector to a baseband signal with at least one frequency tone, thereby extracting the baseband signal contained in the signal provided by the envelope detector.

In some embodiments, the down-converting stage performs an indirect down-conversion for further down-converting the signal provided by the envelope detector to a baseband signal, wherein the down-converting stage comprises the at least one intermediate down-conversion module arranged in series with the envelope detector and comprising a) an intermediate frequency generator, for generating an intermediate frequency tone, the intermediate frequency tone being related to the at least two frequency tones; b) a down-converting means, for down-converting the signal provided by the envelope detector with the intermediate frequency tone, and thereby extracting the baseband signal; and c) a filtering means, for discarding interference.

In another embodiment, the at least one intermediate down-conversion module is a digital down-conversion module, arranged for digitizing the signal provided by the envelope detector and generating a digital baseband signal.

According to a fourth aspect of the present disclosure, there is provided a communication system comprising at least one transmitter in accordance with the second aspect, and at least one receiver in accordance with the third aspect.

BRIEF DESCRIPTION OF THE DRAWINGS

For a better understanding of the present disclosure, reference will now be made, by way of example only, to the accompanying drawings in which.

DETAILED DESCRIPTION OF CERTAIN ILLUSTRATIVE EMBODIMENTS

Figure 1:
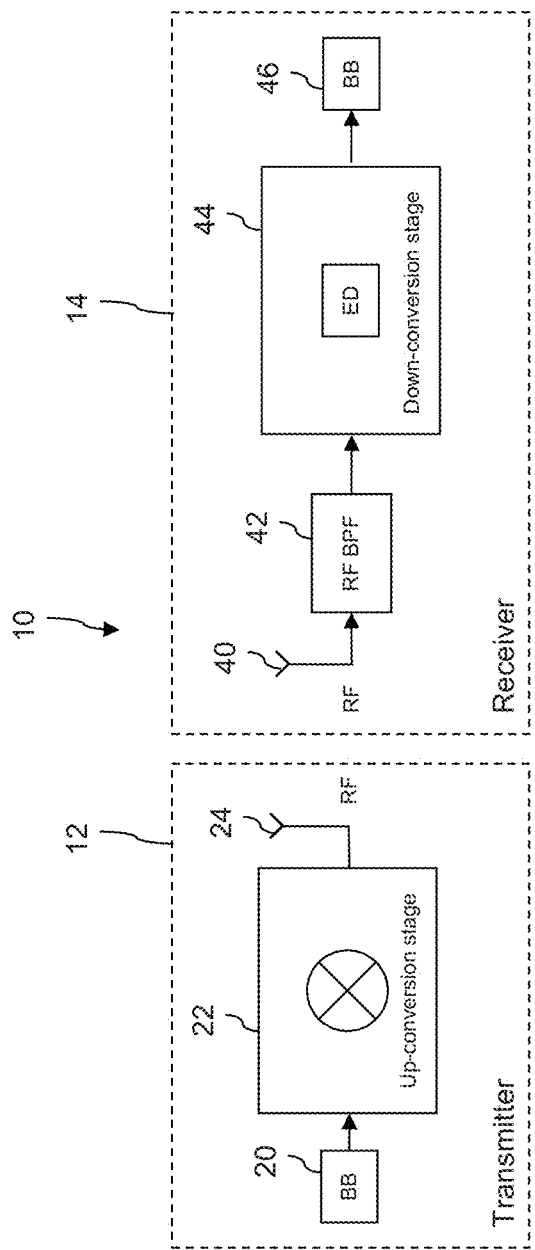
FIG. 1 is a schematic diagram of a conventional radio transmitter/receiver system.

As mentioned above, front-end filters in a low power receiver design, using an envelope detector as the RF down-conversion stage, are typically only suitable for band selection. Within the selected frequency band, an additional interference rejection technique is needed to select the desired signal and to attenuate adjacent frequency interference.

In certain embodiments illustrated here, it is proposed to use two frequency tones (commonly referred as carriers) to carry information from the transmitter, such that a RF signal comprising two radio frequency components (also referred as signals throughout the text) is produced and transmitted. In the receiver, an envelope detector is used to downconvert these two radio frequency components. At the output of the envelope detector an intermodulation component from the two frequency components is obtained, which is located at the frequency offset between the two frequency components. The intermodulation component contains relative frequency information between the two frequency components; amplitude, frequency and phase information of the two frequency components is preserved after the envelope detector. By making use of this relative information, the desired signal can be distinguished from unwanted interference, e.g. from nearby radio systems operating at similar or the same frequency band. Therefore, additional interference rejection is achieved.

Compared to a conventional low power on-off keying (OOK) transceiver, the proposed method requires at least two signals—at least two carrier tones carrying the same information—to be sent by the transmitter. At the receiver side, an envelope detector is still the RF downconversion stage for the RF input, which means that no frequency synthesizer or oscillator at RF frequency is needed. The interference rejection of the disclosed envelope detector based receiver is improved as amplitude, frequency and phase information is extracted, with little impact on low power consumption. The extraction of amplitude, frequency and phase information is achieved as the relative frequency information between the two frequency components is preserved after the envelope detector.

FIG. 2 shows the architecture of two systems 10, each having a transmitter 12 and a receiver 14. The transmitter 12 has a baseband stage (BB) 20, an up-conversion stage 22 for converting the baseband signal to a radio frequency (RF), and a transmit antenna 24. The receiver 14 has a receive antenna 40, a RF band-pass (BP) filter 42, a down-conversion stage 44 including an envelope detector and an additional down-conversion module, for down-converting the RF input signal to baseband, and a baseband processing stage 46 for handling the baseband signal.

Figure 2A:
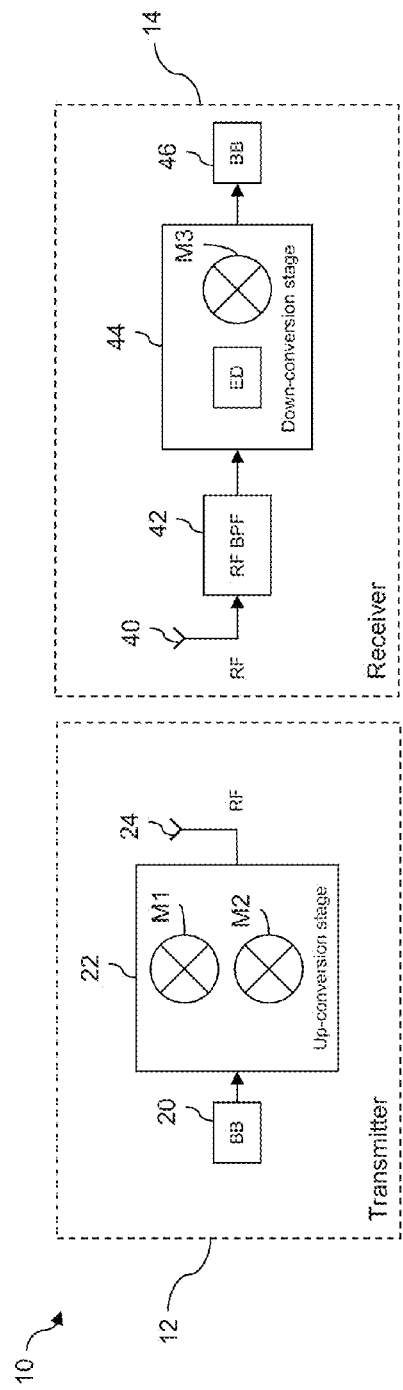
FIG. 2A and FIG. 2B illustrate schematic diagrams of a radio transmitter and a radio receiver system, respectively, in accordance with different embodiments.
Figure 2B:
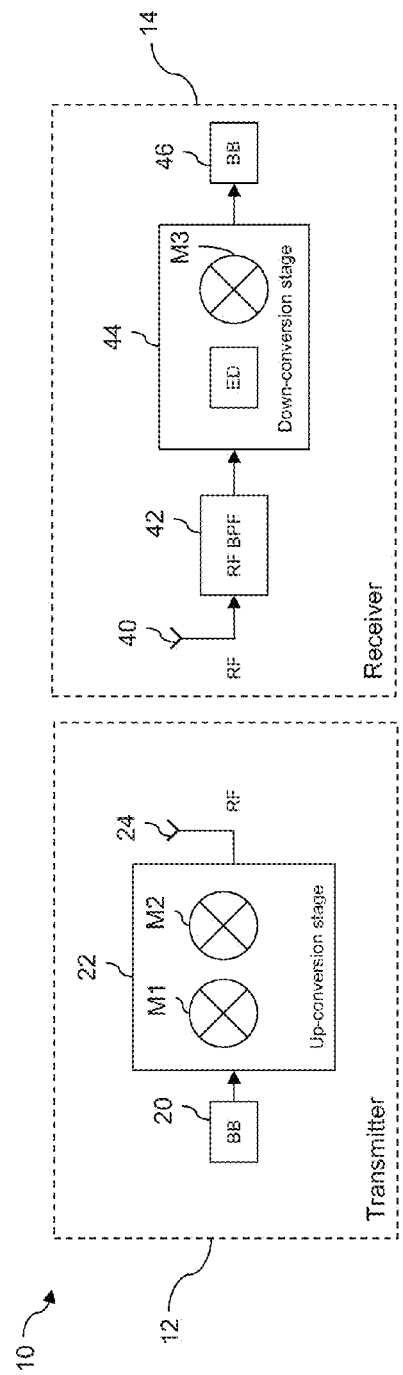

More specifically, FIG. 2A shows an up-conversion stage 22 having two up-conversion modules M1, M2 connected in parallel converting the baseband signal directly to RF, while FIG. 2B shows an up-conversion stage having two up-conversion modules M1, M2 connected in series converting the baseband signal first to an intermediate frequency (IF) and then to RF.

FIG. 2A and FIG. 2B show a down-conversion stage 44 having an intermediate down-conversion module (M3) connected in series with the envelope detector.

As described in more detail below, the transmitter 12 and receiver 14 can operate with low power, and are therefore suitable for use in portable devices, in particular in portable devices that can advantageously contain small batteries or rely on energy scavengers. To allow bidirectional communication, a device can contain both a transmitter and a receiver as described herein, but communication in only one direction will be described in detail as communication in the opposite direction is equivalent.

As also described in more detail below, two RF tones are generated in the transmitter 12, and carry information from the transmitter 12 to the receiver 14. More specifically, in one specific embodiment, the transmitter 12 generates two carrier tones at nominal frequencies $\omega_{C1}$ and $\omega_{C2}$, with the nominal difference between these two carrier tones being referred to as an intermodulation frequency $\omega_{IF}=|\omega_{C1}-\omega_{C2}|$. The baseband information is used to modulate the frequency, phase or amplitude of the carrier tones at $\omega_{C1}$ and $\omega_{C2}$. Thus, the baseband information is encoded in the difference between the two carriers. An optional power amplifier or antenna driver delivers the two tone RF signal to the antenna for transmission to the receiver 14.

A modulation can be achieved by generating a frequency signal from the baseband information. Thus, using e.g. amplitude modulation, a digital "1" can be used to generate a signal at the desired frequency, while a digital "0" can be used to set the frequency signal to zero. Using phase modulation, a digital "1" can be used to generate a signal at the desired frequency with a certain phase, while a digital "0" can be used to generate a signal with the same frequency but with a different phase. Using frequency modulation, a digital "1" can be used to generate a signal at one desired frequency, while a digital "0" can be used to generate a signal at a slightly different frequency.

In the proposed implementation, the baseband information modulates one of the properties of the multiple carrier tones, as follows. For example, the amplitude of the carriers can be a function of the baseband information, so that when '0' is transmitted, the carrier tones have lower amplitude or no amplitude, and when '1' is transmitted, the carrier tones have higher amplitude. Also the baseband information can be embedded to the frequency offset between these carrier tones, in a way that when '0' is transmitted, the carrier tones have smaller frequency spacing, and when '1' is transmitted, the carrier tones have larger frequency spacing. In addition, the baseband information can be embedded to the phase difference between these carrier tones as well. This means when '0' is transmitted, the carrier tones have the same phase, and when '1' is transmitted, the carrier tones have different phases. Similar techniques can be applied when more than tones are used to carry the baseband information.

As described above FIG. 2A shows a direct up-conversion of the baseband information directly to RF frequency. In this case, any of the three different modulations can be used (amplitude, frequency or phase). For indirect up-conversion (FIG. 2B), however, the first up-conversion can be any one of the three types of modulation, while the second up-conversion used to generate the RF signal is using an amplitude modulation. Thus, whichever modulation technique (has been used to generate the RF signal, the intermediate frequency signal is used as the envelope of the carriers.

In one embodiment, the low power receiver 14 can consist of an RF front-end filter 42, an optional RF amplifier (not shown in the figure), a down-conversion stage 44, comprising an envelope detector ED and an intermediate down-conversion module M3 and a baseband stage 46. The received RF signal (comprising the two frequency components) is filtered by the front-end filter so that out-of-band interference is suppressed. Then the signal may be amplified and fed to the envelope detector. The envelope detector down-converts the RF signal. The envelope detector is implemented with devices having even-order non-linearity. In general, the $2^{nd}$ order non-linearity is usually dominant, and thus the envelope detector can be modeled as a squarer, which multiplies the RF input by itself, and a low-pass filter, which eliminates the high-frequency components of the squared signal.

Figure 3:
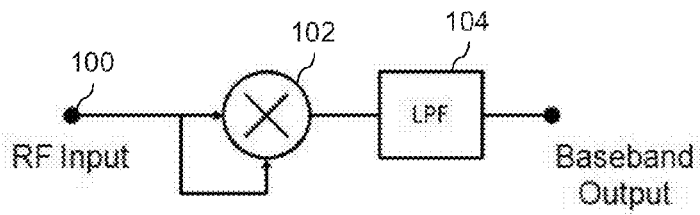
FIG. 3 is a schematic diagram, illustrating an envelope detector.

FIG. 3 shows a generic model of an envelope detector which is represented as a multiplier (102) and a low-pass filter (104). An RF input signal is received at an input terminal 100, and passed to one input of a multiplier 102. The same signal is passed to the other input of the multiplier 102, so that the multiplier has the effect of multiplying the input signal by itself, i.e. squaring it. Thus, if the RF input signal is denoted by x, the output signal $y=k \cdot x^2$, where k is a scaling factor related to the circuit property of the envelope detector. The output from the multiplier 102 is passed to the low pass filter 104.

As described above, certain embodiments relate to systems in which the transmitter generates a RF signal comprising two frequency components ($\omega_{C1}$ and $\omega_{C2}$). The RF input to the envelope detector can be written as:

$$x = A_{BB1} \cos(\omega_{C1} t + \phi_1) + A_{BB2} \cos(\omega_{C2} t + \phi_2),$$

where $A_{BB1}$ and $A_{BB2}$ are the amplitudes of the two components at $\omega_{C1}$ and $\omega_{C2}$ which e.g. may represent the baseband information carried by these two carrier tones, and $\phi_1$ and $\phi_2$ are the respective phases of these two components.

Then, the resulting signal from the multiplier 102 of the envelope detector is:

$$\begin{aligned}
Y &= k \cdot x^2 \\
&= k \cdot (A_{BB1} \cos(\omega_{c1} t + \varphi_1) + A_{BB2} \cos(\omega_{c2} t + \varphi_2))^2 \\
&= k \cdot (A_{BB1}^2 \cos^2(\omega_{c1} t + \varphi_1) + A_{BB2}^2 \cos^2(\omega_{c2} t + \varphi_2) + \\
&\quad 2 \cdot A_{BB1} \cdot A_{BB2} \cos(\omega_{c1} t + \varphi_1) \cdot \cos(\omega_{c2} t + \varphi_2)) \\
&= k \cdot \left[ \left( \frac{1}{2} A_{BB1}^2 + \frac{1}{2} A_{BB1}^2 \cdot \cos(2\omega_{c1} t + 2\varphi_1) \right) + \right. \\
&\quad \left( \frac{1}{2} A_{BB2}^2 + \frac{1}{2} A_{BB2}^2 \cdot \cos(2\omega_{c2} t + 2\varphi_2) \right) + \\
&\quad A_{BB1} A_{BB2} \cos(\omega_{c1} t + \omega_{c2} t + \varphi_1 + \varphi_2) + \\
&\quad \left. A_{BB1} A_{BB2} \cos(\omega_{c1} t - \omega_{c2} t + \varphi_1 - \varphi_2) \right]
\end{aligned}$$

It can therefore be seen that the signal at the output of the envelope detector contains frequency components at DC frequency and at the RF frequencies $2\omega_{C1}$ and $2\omega_{C2}$, and intermodulation components at ($\omega_{C1}+\omega_{C2}$) and ($\omega_{C1}-\omega_{C2}$) frequency, wherein the desired component is the intermodulation component at the lower frequency:

$$k \cdot A_{BB1} A_{BB2} \cos(\omega_{IF} t + \phi_{IF}), \text{ where } \omega_{IF} = \omega_{C1} - \omega_{C2} \text{ and } \phi_{IF} = \phi_1 - \phi_2,$$

which contains relative Information about the amplitude, frequency and phase of the two frequency components ($\omega_{C1}$ and $\omega_{C2}$).

The low pass filter 104 shown in FIG. 3 removes the RF components which may saturate the subsequent blocks of the receiver. Its cut-off frequency is defined to be higher than frequency of the desired component ($\omega_{IF} = \omega_{C1} - \omega_{C2}$). The frequency components located at either DC and RF frequencies may be removed by, for example, substituting the LPF with a band-pass filter (BPF) or by using an additional BPF at the output of the envelope detector, with a passband centered at the intermodulation frequency $\omega_{IF}$ may be used. For clarity, in the description and figures, a separate BPF has been used.

The use of an envelope detector for down-converting (demodulating) an RF signal, comprising two frequency components both carrying the same information, results in extraction of an intermediate signal with an intermodulation frequency carrying relative frequency information of the two frequency components. This relative frequency information helps to distinguish between the desired signal and any interference that may be present. If an interfering signal appears together with the two RF components at the input of the envelope detector, unwanted intermodulation components will also be generated at the output of the envelope detector. These unwanted intermodulation components are located at the offset frequencies between the interference and RF components, and as long as they do not overlap with the desired intermodulation frequency component, the desired signal can still be distinguished. The usage of an envelope detector as the first downconverting stage for the RF input implies that it is not necessary to provide a frequency synthesizer or oscillator at the RF frequency. As the uniqueness of the intermodulation frequency is preserved, the interference rejection remains high.

The proposed design therefore allows for relaxing the requirements of the filters used in the receiver. For example, a conventional RF front-end filter may be used. Additionally, the filters located between the down-conversion stages (not shown) and at the input of the baseband path of the receiver may as well have relaxed filter requirements as the desired signal may be isolated (separated) from unwanted frequency components and interferences as their frequencies do not overlap.

In the receiver, a passive front-end filter may be used to remove out-of-band interference, and the two RF components can be self-mixed by the envelope detector.

At the output of the envelope detector, a band-pass filter may be used to remove the unwanted frequency components at DC and higher frequencies, while passing through the desired intermodulation component (IF). To obtain the baseband information, the IF component is further processed by downconverting it either in the analog domain or digital domain.

The output signal of the envelope detector (SED) contains the desired intermodulation component at the frequency offset of the two frequency components, i.e. $\omega_{IF} = \omega_{C1} - \omega_{C2}$. This signal may be amplified and band-pass filtered, so that only the IF signal (component) is kept while the other frequency components attenuated. The signal around DC frequency may also be discarded, or it can be optionally used as the desired signal if there is no interference present; in this specific case the receiver will operate as a conventional envelope detector radio.

The IF signal (located at $\omega_{IF}$) is then downconverted by a (quadrature) mixer M3 to baseband around DC frequency. Since $\omega_{IF}$ can be chosen to be much lower than the carrier frequencies, for example below 10 MHz, accurate frequency references at $\omega_{IF}$ are available with low power consumption. For example, a crystal oscillator can be used directly as the local oscillator, which results in excellent frequency stability and phase noise/jitter performance.

At the output of the IF down-converting stage, a low pass filter (not shown in FIG. 2) may be used to remove unwanted signals at frequencies higher than the baseband bandwidth. For narrowband applications, the baseband bandwidth is narrow, which enables the use of higher-order filters with low power consumption. The output of the baseband low-pass filter can be used to demodulate the original baseband bits, either in the analog domain or the digital domain.

Figure 4:
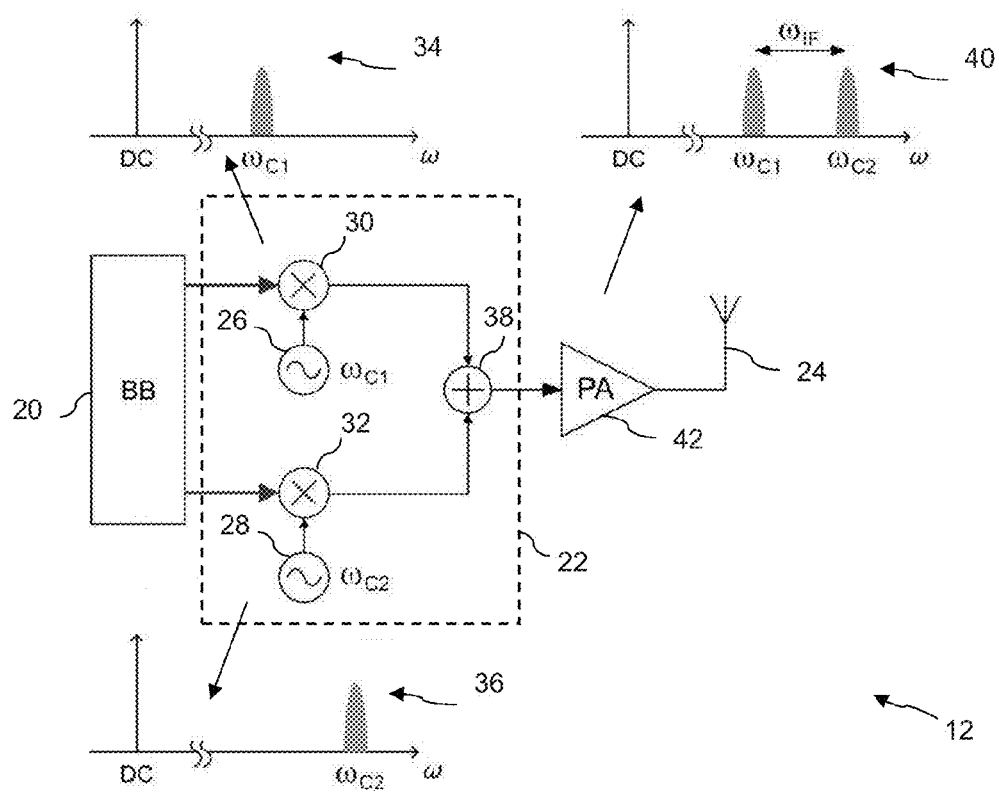
FIG. 4 is a schematic diagram of a first radio transmitter, in accordance with one embodiment.

FIG. 4 is a more detailed block schematic diagram, showing one embodiment of the transmitter 12.

In this embodiment, the up-conversion stage 22 includes two RF frequency generators 26, 28 (also commonly referred as oscillators or local oscillators), each generating a single RF tone at a respective frequency $\omega_{C1}$, $\omega_{C2}$. Baseband information is generated in the baseband processing block 20, and is passed to two mixers 30, 32. In the mixer 30, baseband information is imposed on the RF tone at $\omega_{C1}$, producing a first RF signal having only one frequency component having a frequency characteristic as shown by the reference numeral 34, while, in the mixer 32, baseband information is imposed on the RF tone at $\omega_{C2}$, producing a second RF signal, again having only one frequency component with a frequency characteristic as shown by the reference numeral 36.

The two RF signals 30, 32 are then combined in an adder 38 to form a RF signal to be transmitted, as shown by the reference numeral 40. This RF signal has components at the two separate frequencies $\omega_{C1}$ and $\omega_{C2}$, where the difference between these frequencies (or their frequency offset) is referred to as intermodulation frequency $\omega_{IF}=|\omega_{C1}-\omega_{C2}|$. In other words, the frequency offset between the RF tones, and consequently, the frequency offset between the RF signals is equivalent to the intermodulation frequency. In some embodiments, the frequencies $\omega_{C1}$ and $\omega_{C2}$ might be in the region of 500 MHz-5 GHz, and the intermodulation frequency $\omega_{IF}$ might be in the region of 1 MHz-100 MHz.

The two carriers may be modulated with the phase, frequency or amplitude information of the baseband signal. The summation of the two modulated RF tones (30, 32), i.e. the RF signal (40), results in encoding the baseband information in the frequency offset of those two RF signals (30, 32).

The combined signal may be then passed to a power amplifier 42, and then to an antenna 24 for transmission.

In this embodiment, it is advantageous for the eventual receiver if the intermodulation frequency $\omega_{IF}$ is known precisely. In order to achieve this, the two oscillators 26, 28 need to be synchronized. For example, the two oscillators can be phase locked by respective phase locked loops (PLLs). Circuit and algorithm that synchronize the frequencies and phases of the two oscillators are also needed in the baseband processor 20.

This transmitter architecture is flexible, in that sense that if one of the oscillators 26, 28 is switched off the transmitter will work as a conventional radio transmitter.

In addition, it is possible to add another RF signal path (i.e. an additional oscillator and a mixer), by generating a signal at a third frequency ($\omega_{C3}$) and encoding the data to be transmitted in the frequency, phase, or amplitude of that third RF carrier, and thus producing a RF signal comprising three RF components carrying the same information.

Figure 5:
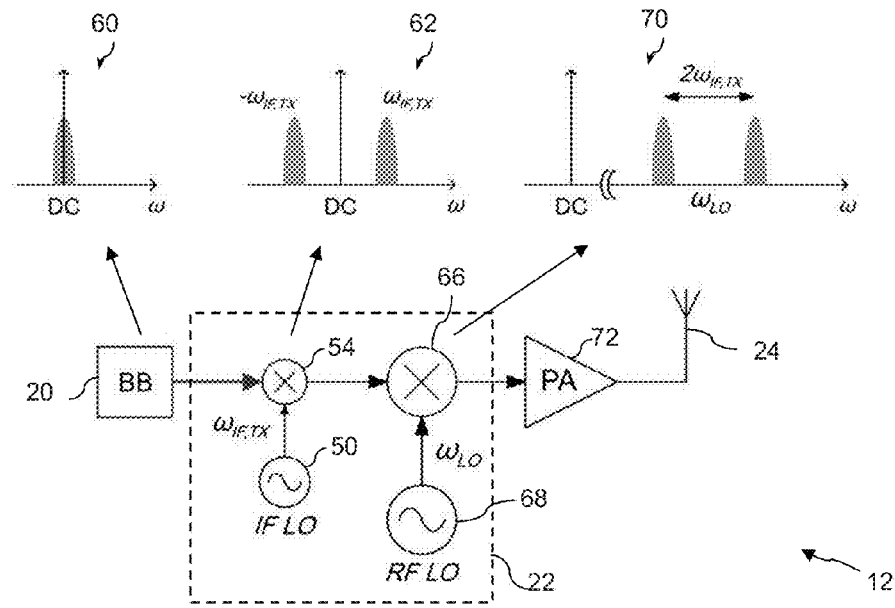
FIG. 5 is a schematic diagram of a second radio transmitter, in accordance with embodiment.

FIG. 5 is another detailed block schematic diagram, showing an alternative embodiment of the transmitter 12.

In this embodiment, a local oscillator 50 generates a frequency tone at an intermediate frequency $\omega_{IF,TX}$. This tone is passed to one of the inputs of a mixer 54.

The baseband processor 20 generates baseband information, as shown by the reference numeral 60, and passes it to the other input of the mixer 54. The mixer 54 up-converts the baseband data to intermediate frequency by mixing the baseband data with the IF tone. This process of up-converting or modulation encodes the baseband information from the baseband processor 20 in the IF tone, such that at the output of the mixer 54 an IF signal at $\omega_{IF}$ frequency is produced.

In frequency domain, this signal contains two frequency components at $+/-\omega_{IF,TX}$, as shown by reference numeral 62.

Similarly, as in the previous embodiment illustrated in FIG. 4, the baseband information may be embedded in the intermediate frequency tone, using phase, frequency or amplitude modulation, that is by adapting the frequency, phase or amplitude of the frequency tone according to the baseband information.

The intermediate frequency signal, i.e. the modulated IF tone, is then passed to a second mixer 66, which also receives a RF tone at the carrier frequency $\omega_{LO}$ from a RF local oscillator 68.

The second mixer 66, which is a double-sideband mixer, up-converts the IF signal to RF frequency and outputs a RF signal containing components at $(\omega_{LO}+\omega_{IF,TX})$ and at $(\omega_{LO}-\omega_{IF,TX})$, as shown by the reference numeral 70.

The output of the second mixer 66 is then passed to an optional power amplifier 72, and then to the antenna 24 for transmission.

This architecture therefore has the advantage that there is only one RF oscillator instead of two as in FIG. 4, which reduces the power consumption. Moreover, there is no need of synchronization between the IF and RF local oscillators since the relationship between the two RF components in the RF signal is derived from the IF signal. As long as the phase and frequency of the IF signal are accurate, the frequency and phase offset between the two RF components are also accurate.

Figure 6:
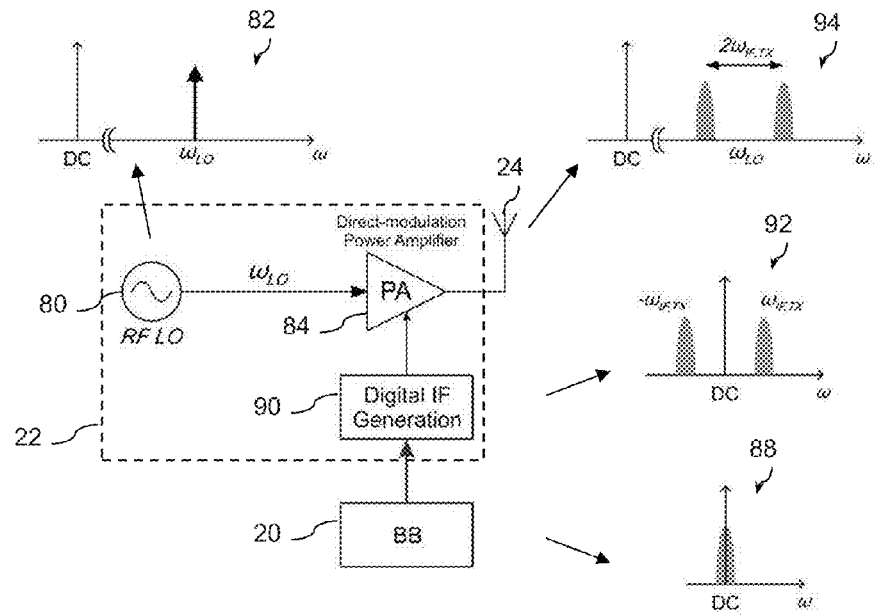
FIG. 6 is a schematic diagram of a third radio transmitter, in accordance with embodiment.

FIG. 6 is another detailed block schematic diagram, showing an alternative embodiment of the transmitter 12.

In this embodiment, a baseband processor 20 generates baseband information, for example as shown by the reference numeral 88, and passes it to a digital IF generation block 90. The digital IF generation block 90, first digitizes the baseband signal and then up-converted. The IF generation block 90 runs at a higher clock frequency than the frequency of the baseband signal, and so it generates a digital IF signal containing one IF component at intermediate frequency at $\omega_{IF,TX}$. Illustrated in frequency domain, this IF component contains two components at $+/-\omega_{IF,TX}$, as shown by reference numeral 92.

A local oscillator 80 generates a RF tone at a frequency $\omega_{LO}$, as shown by the reference numeral 82. This carrier tone is passed to a direct modulation power amplifier 84, which receives the digital IF signal at its control input, which is used to modulate the RF carrier tone. The direct modulation power amplifier 84 modulates the radio frequency tone with the IF signal and produces an amplified RF signal with components at $(\omega_{LO}+\omega_{IF,TX})$ and at $(\omega_{LO}-\omega_{IF,TX})$, as shown by the reference numeral 94.

This signal is then passed to the antenna 24 for transmission.

In this embodiment, as the IF signal generation is in the digital domain and only one RF oscillator is used, the need of phase locked circuitry is avoided, which greatly reduces the analogue circuitry and hence the total power consumption. Further, since the IF frequency is relatively low (e.g. several megahertz), the generation of the IF tone is more flexible, since digital circuits can be reconfigured and reprogrammed if needed.

As described above, certain embodiments encode the baseband data in the difference, i.e. frequency offset, between the two RF components in the RF signal to be transmitted.

This specific up-converting scheme, i.e. up-converting the baseband information with two frequency tones, allows, in the receiver, an envelope detector to be used for downconversion of the RF signal, which not only extracts the amplitude information from an RF input signal but also preserve the frequency and phase difference between the two frequency tones carrying the baseband information. Consequently, this improves the differentiation of the desired signal (i.e. the baseband information) from the carrier and present interference.

Figure 7:
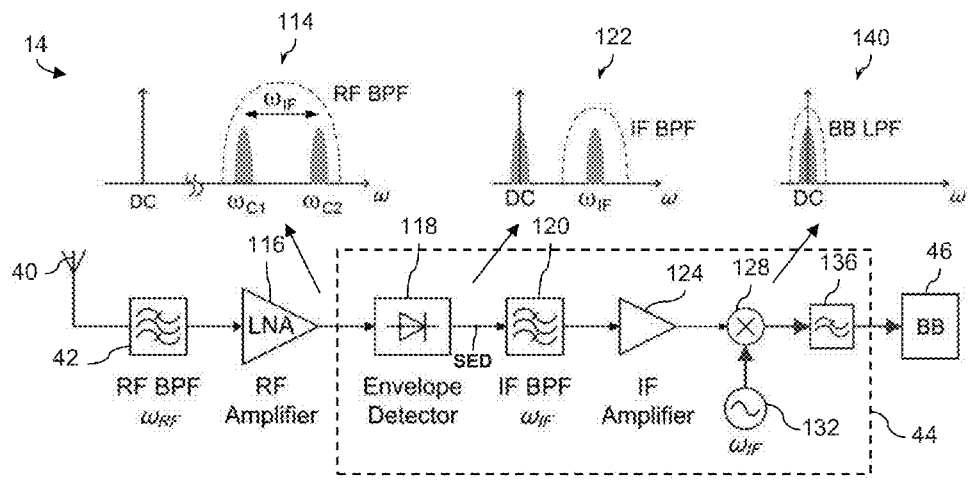
FIG. 7 is a schematic diagram of a first radio receiver, in accordance with embodiment, including an envelope detector.

FIG. 7 illustrates one embodiment of a receiver 14 operating in accordance with this principle.

In the receiver of FIG. 7, an antenna 40 detects a RF signal, and passes it through a RF bandpass filter 42 to remove the out-of-band interference. The passband of the bandpass filter 42 is set such that the output of the bandpass filter 42 is a signal as indicated by the reference numeral 114, with RF components: at $\omega_{C1}$ and at $\omega_{C2}$ or at $(\omega_{LO}+\omega_{IF,TX})$ and at $(\omega_{LO}-\omega_{IF,TX})$ depending on the specific transmitter implementation, shown in FIG. 4, and FIGS. 5 and 6, respectively. This signal is passed to an optional low noise RF amplifier (LNA) 116, and the amplified signal is passed to the down-conversion stage 44, and specifically to an envelope detector 118, which may take the form of a squaring device as described above.

As also described above, the envelope detector 118 produces an output signal containing components at DC frequency, at RF frequencies $2.\omega_{C1}$ and $2.\omega_{C2}$ and at intermodulation frequencies $(\omega_{C1}+\omega_{C2})=(\omega_{LO}-\omega_{IF,TX})+(\omega_{LO}-\omega_{IF,TX})=2.\omega_{LO}$ and $(\omega_{C1}-\omega_{C2})=(\omega_{LO}+\omega_{IF,TX})-(\omega_{LO}-\omega_{IF,TX})=2.\omega_{IF,TX}$.

This output signal (SED) may be passed to a bandpass filter 120 with a passband centered at $2.\omega_{IF,TX}$, so that only the component at the lower intermediate frequency, i.e. $\omega_{IF}=2.\omega_{IF,TX}$ passes through the filter, while the DC and RF components are rejected, as shown by the reference numeral 122. The bandpass filter 120 also attenuates intermodulation signals generated by interfering signals at other RF frequencies, as those intermodulation signals will be located at different frequencies from the desired intermediate frequency signal ($\omega_{IF}=2.\omega_{IF,TX}$).

The envelope detector 118 performs down-conversion of the RF input signal to an intermediate frequency and together with the filter 120 form the RF down-conversion module. This greatly simplifies the circuitry in RF stage, and hence the power consumption. The intermediate frequency signal is passed to an optional IF amplifier 124, and the amplified signal is passed to an intermediate frequency down-conversion module.

The output signal of the amplifier 124 is passed to a mixer 128. A local oscillator 132 generates a local oscillator tone at the intermodulation frequency $\omega_{IF}=2.\omega_{IF,TX}$, and this is passed to a second input of the mixer 128.

An accurate frequency reference is required for the local oscillator 132, for example a phase locked loop (PLL) or a crystal oscillator may be used. Since the intermodulation frequency tone to be generated is much lower than the RF frequencies, e.g. 10 MHz, the intermediate down-conversion module (comprising the local oscillator 132) does not have a large adverse impact on the power consumption of the receiver.

The mixer 128 downconverts the intermodulation signal to baseband, as shown by the reference sign 140, by mixing the intermodulation signal with the local oscillator tone. The baseband signal is passed through a low-pass filter 136 to remove the higher frequency mixer output components. As shown by the reference numeral 140, these allow the DC component (i.e. baseband information) to be passed to the baseband processing block 46.

As described above, the information transmitted to the receiver 14 can be embedded in the transmitted signals by phase modulation, frequency modulation, or amplitude modulation of the carriers. Thus, the intermediate down-conversion module is adapted to extract this information from the intermediate frequency component generated by the bandpass filter 120, using conventional techniques for demodulating signals that have been phase, frequency or amplitude modulated.

Figure 8:
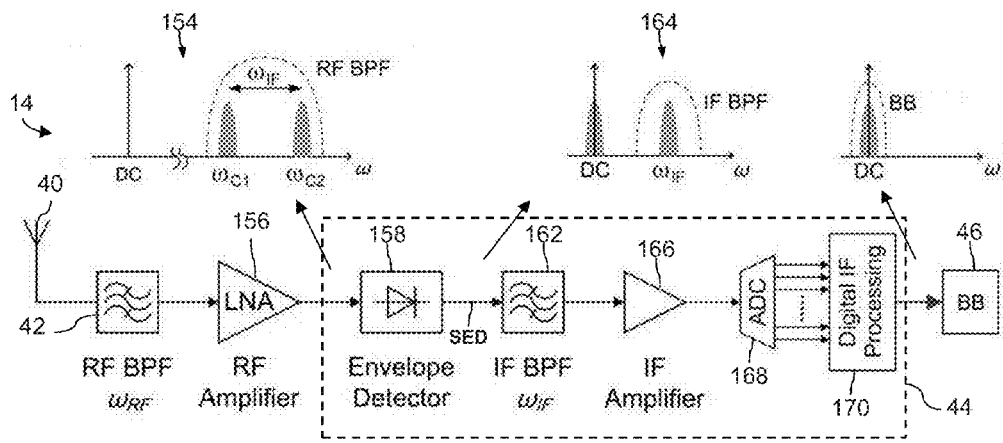
FIG. 8 is a schematic diagram of a second radio receiver, in accordance with embodiment, including an envelope detector.

FIG. 8 illustrates another embodiment of a receiver 14 operating in accordance with the same principle.

In the receiver of FIG. 8, an antenna 40 detects the RF signals, and passes them through a RF bandpass filter 42 to remove the out-of-band interference. The passband of the bandpass filter 42 is set such that the two transmitted signals at $\omega_{C1}$ and $\omega_{C2}$, with a frequency offset of $\omega_{IF}=\omega_{C1}-\omega_{C2}$, can be passed through, as indicated by the reference numeral 154.

This RF signal is passed to an optional low noise RF amplifier (LNA) 156, and the amplified signal is passed to the down-conversion stage 44, and specifically to an envelope detector 158, which may take the form of a squaring device as described above.

As also described above, the envelope detector 158 produces an output signal (SED) containing components at DC frequency, at RF frequencies $2.\omega_{C1}$ and $2.\omega_{C2}$, as well as intermediate frequencies at $(\omega_{C1}+\omega_{C2})$ and $(\omega_{C1}-\omega_{C2})$.

This output signal is then passed to a bandpass filter 162 with its passband centered at $\omega_{IF}=(\omega_{C1}-\omega_{C2})$, so that only the intermediate component at the lower frequency $(\omega_{C1}-\omega_{C2})$ passes through the filter, while the DC and higher frequency components are rejected, as shown by the reference numeral 164. The envelope detector 158 and the optional filter 162 thus perform a first downconversion of the RF signal to an intermediate frequency. The intermediate frequency signal is passed to an optional amplifier 166.

In this embodiment, the intermediate frequency signal is not further downconverted by a mixer using a local oscillator tone at intermediate frequency, but is directly digitized by an analog-digital converter (ADC) 168. The digital output of the ADC 168 is passed to digital IF processing logic 170, which extracts the baseband information from the digitized intermediate signal, using conventional techniques for demodulating digital signals that have been phase, frequency or amplitude modulated. Thus, the downconversion of the intermediate signal to baseband is performed in digital domain and not in analogue as in the embodiment illustrated in FIG. 7.

Since the intermediate down-conversion is performed in digital domain, the analogue circuitry has lower complexity; there is no local oscillator, no mixer nor a narrow bandwidth low-pass filter. Therefore, the size of the receiver chip is reduced. Furthermore, the digital IF down-conversion provides more flexibility that an analogue one, because the digital circuits can be easily programmed to support different modulation, data-rate, etc.

The embodiments illustrated above use two frequency tones (carriers), with the information to be transmitted being embedded in the difference between these two signals. The same technique can be expanded to the use of a multiple carriers, so that (i) the transmitted RF signal comprises multiple frequency components, and (ii) multiple intermodulation frequency components can be obtained after envelope detection. These intermodulation components can be processed to obtain improved interference rejection, although this is at the cost of increase complexity and power consumption.

Figure 9:
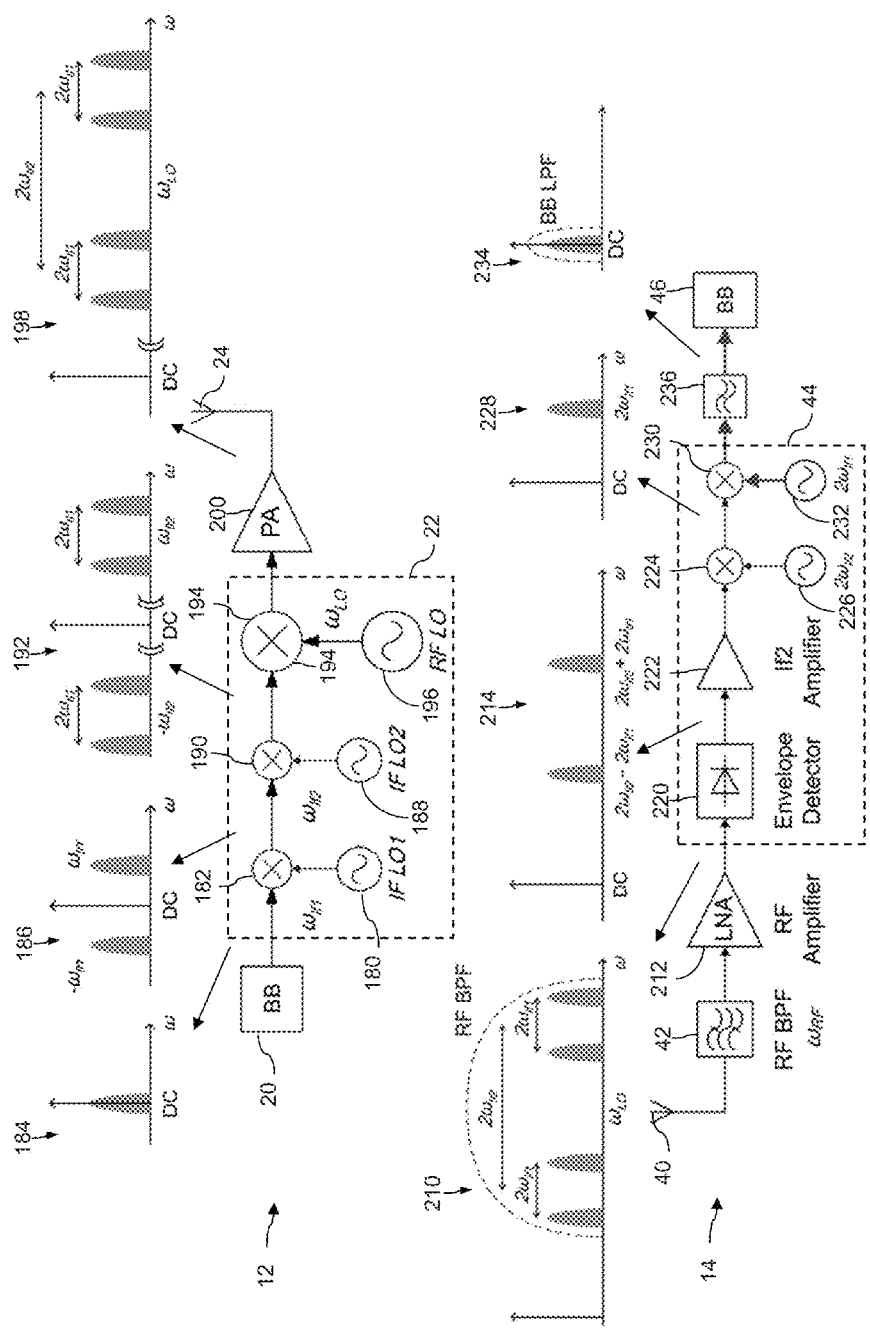
FIG. 9 is a schematic diagram of a radio transmitter/receiver system, in accordance with embodiment, including an envelope detector.

FIG. 9 is a block schematic diagram of a transmitter 12 and receiver 14 operating in this way.

In this embodiment, a first local oscillator 180 generates a tone at a first intermediate frequency $\omega_{IF1}$. This signal is passed to one input of a first mixer 182.

The baseband processor 20 generates baseband information, for example as shown by the reference numeral 184, and passes it to the other input of the mixer 182.

The output of the first mixer 182 is a signal that contains only one frequency component at a first intermediate frequency ($\omega_{IF1}$), which in frequency domain contains two components at $+/-\omega_{IF1}$, as shown by reference numeral 186. Thus, the baseband information is embedded in this first intermediate frequency signal, using phase, frequency or amplitude modulation.

A second local oscillator 188 generates a tone at a second intermediate frequency $\omega_{IF2}$, which in this embodiment is higher than the first intermediate frequency $\omega_{IF1}$. This second intermediate frequency tone is passed to one input of a second mixer 190. The first intermediate frequency signal at $\omega_{IF1}$, is passed to the other input of the mixer 190. Thus, the mixer 190 generates a second intermediate frequency signal, with component at $\omega_{IF2}=(\omega_{IFLO2}+\omega_{IF1})$ which in frequency domain comprises components at $(\omega_{IF2}+/-\omega_{IF1})$ and $(-\omega_{IF2}+/-\omega_{IF1})$ frequencies, as shown by the reference numeral 192.

The second intermediate frequency signal located at $\omega_{IF2}$ is then passed to a final mixer 194, which also receives a tone at the intended carrier frequency $\omega_{LO}$ from a RF local oscillator 196.

Thus, the final mixer 194 performs up-conversion of the second intermediate signal to radio frequency, wherein the output of the mixer 194 contains components at $(\omega_{LO}+\omega_{IF2}+\omega_{IF1})$, at $(\omega_{LO}+\omega_{IF2}-\omega_{IF1})$, at $(\omega_{LO}-\omega_{IF2}+\omega_{IF1})$ and at $(\omega_{LO}-\omega_{IF2}-\omega_{IF1})$ as shown by the reference numeral 198.

The output of the final mixer 194 is then passed to an optional power amplifier 200, and then to the antenna 24 for transmission.

In the receiver of FIG. 9, an antenna 40 detects the RF signal, and passes it through a RF bandpass filter 42 to remove the out-of-band interference. The passband of the bandpass filter 42 is set such that the output of the bandpass filter 42 is a signal as indicated by the reference numeral 210, with components at $(\omega_{LO}+\omega_{IF2}+\omega_{IF1})$, at $(\omega_{LO}+\omega_{IF2}-\omega_{IF1})$, at $(\omega_{LO}-\omega_{IF2}+\omega_{IF1})$ and at $(\omega_{LO}-\omega_{IF2}-\omega_{IF1})$. This signal is passed to an optional low noise RF amplifier (LNA) 212, and the amplified signal is passed to the down-conversion stage 44, and specifically to an envelope detector 220, which may take the form of a squaring device as described above.

In this case, as can be derived from the analysis above, the envelope detector 220 produces an output signal containing components at DC frequency, at various RF frequencies, and at intermodulation frequencies at RF frequency, i.e. $(2.\omega_{LO})$, $(2.\omega_{LO}\pm2.\omega_{IF1})$, $(2\omega_{LO}\pm2\omega_{IF2})$, but also produces intermodulation components at lower intermodulation frequencies $(2.\omega_{IF2}-2.\omega_{IF1})$ and $(2.\omega_{IF2}+2.\omega_{IF1})$, as shown by reference numeral 214. The envelope detector 220 thus performs a downconversion to a first intermediate frequency.

The output (SED) of the envelope detector 220 is passed to an optional intermediate frequency amplifier 222, and then to a first down-conversion mixer 224, which receives a tone at a frequency $2.\omega_{IF2}$ from a local oscillator 226. This produces a down-converted signal at second intermediate frequency lower than the first intermediate frequency, i.e. at as shown by reference numeral 228.

This down-converted signal 228 is passed to a second down-conversion mixer 230, which receives a tone at a frequency $2.\omega_{IF1}$ from a local oscillator 232, wherein $2.\omega_{IF1}$ is lower than $2.\omega_{IF2}$. This produces a down-converted signal at baseband, as shown by reference numeral 234.

The output signal of the down-converting stage 44 is passed to a bandpass filter 236 to remove interference at higher frequencies. The filtered DC component (i.e. baseband information) is then passed to the baseband processing block 46.

As described above, the information transmitted to the receiver 14 can be embedded in the transmitted signals upon their phase, frequency, or amplitude. Similarly, to the previously described embodiments, the requirements on the front-end filter 42, on the low-pass filter 236, and on the filters located in between the intermediate down-conversion stages (not shown in the figure) may be relaxed.

In conclusion, the proposed radio architecture enables in-band interference rejection for envelope detector based receivers without losing their simplicity and low power consumption.

There is therefore disclosed a radio architecture that provides good frequency selectivity and interference rejection performance, while using an envelope detector to provide the RF downconverting stage in the receiver, so that an accurate RF frequency reference is not required and the simplicity in the RF front-end of the receiver is ensured.

Figure 10:
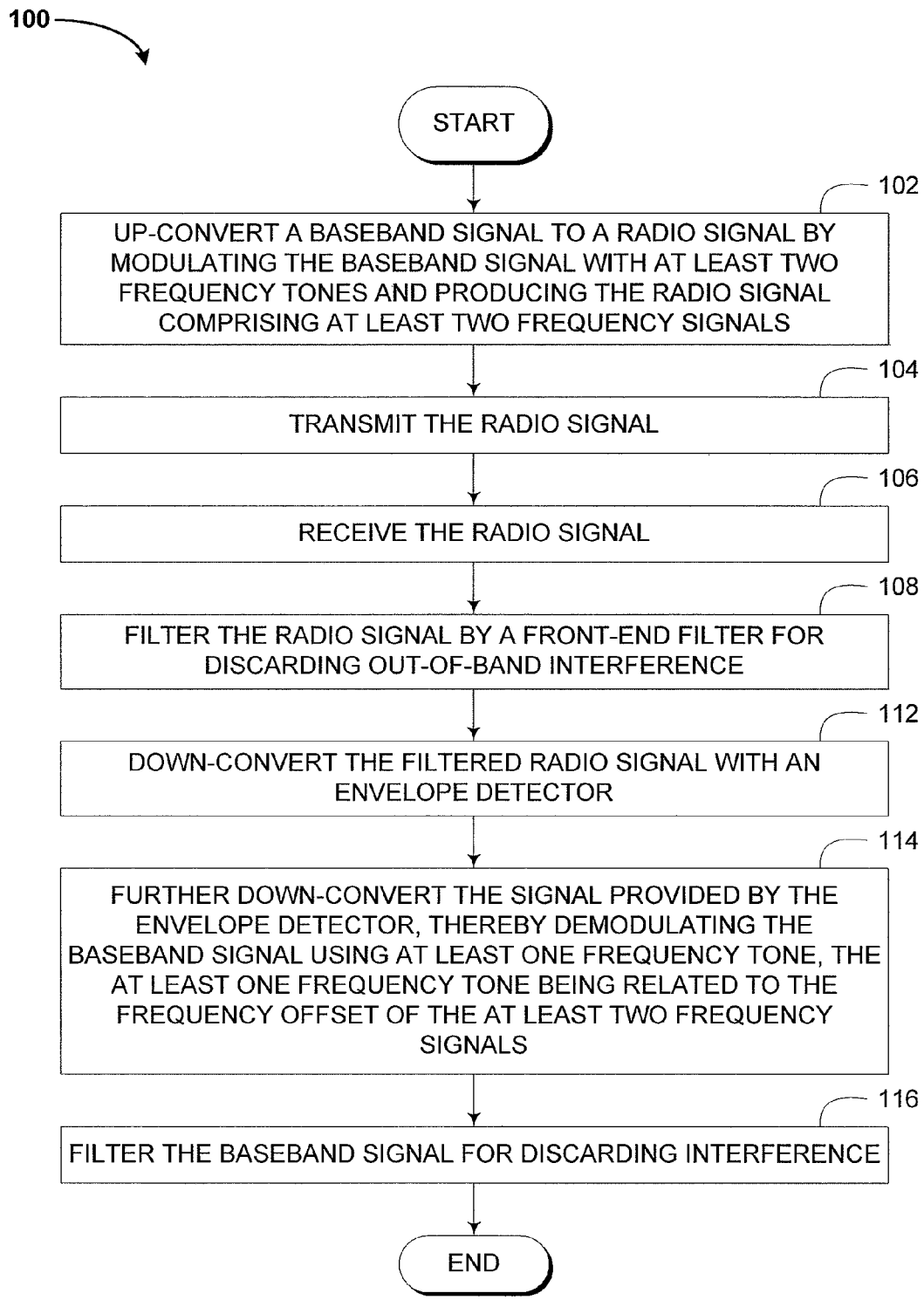
FIG. 10 shows a flowchart of one embodiment of a method of rejecting interference in a communication system comprising a transmitter and a receiver.

FIG. 10 shows a flowchart of one embodiment of a method of rejecting interference in a communication system comprising a transmitter and a receiver. Starting at a block 102, the method 100 includes, in the transmitter, up-converting a baseband signal to a radio signal by modulating the baseband signal with at least two frequency tones and producing the radio signal comprising at least two frequency signals. Next at a block 104, the method includes transmitting the radio signal. Moving to block 106, the method includes, in the receiver, receiving the radio signal. Next at block 108, the method includes, in the receiver, filtering the radio signal by a front-end filter for discarding out-of-band interference. Moving to block 112, the method includes, in the receiver, down-converting the filtered radio signal with an envelope detector. Next at block 114, the method includes, in the receiver, further down-converting the signal provided by the envelope detector, thereby demodulating the baseband signal using at least one frequency tone, the at least one frequency tone being related to the frequency offset of the at least two frequency signals. Moving to block 116, the method includes, in the receiver, filtering the baseband signal for discarding interference.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

The invention claimed is:

1. A receiver comprising:
   a receiving unit configured to receive a radio signal, the radio signal being a baseband signal modulated with at least two frequency tones;
   a filtering unit configured to filter the radio signal, thereby discarding out-of-band interference; and
   a down-converting stage configured to down-convert the radio signal to a baseband signal, the down-converting stage comprising an envelope detector configured to receive and down-convert the radio signal, the down-converting stage further comprising at least one intermediate down-conversion module configured to further down-convert the signal provided by the envelope detector to a baseband signal with at least one frequency tone, thereby extracting the baseband signal contained in the signal provided by the envelope detector.

2. A method of rejecting interference in a communication system comprising a transmitter and the receiver of claim 1, the method comprising:
   in the transmitter:
      up-converting a baseband signal to a radio signal by modulating the baseband signal with at least two frequency tones and producing the radio signal comprising at least two frequency signals; and
      transmitting the radio signal;
   in the receiver:
      receiving the radio signal in the envelope detector;
      filtering the radio signal;
      down-converting the filtered radio signal with the envelope detector;
      further down-converting the signal provided by the envelope detector, thereby demodulating the baseband signal using at least one frequency tone, the at least one frequency tone being related to the frequency offset of the at least two frequency signals; and
      filtering the baseband signal for discarding interference.

3. The method for interference rejection in a communication system according to claim 2, wherein the signal provided by the envelope detector comprises relative frequency information of the at least two frequency signals thereby providing optimal interference rejection.

4. The method for interference rejection in a communication system according to claim 2, wherein in the transmitter, the up-converting of the baseband signal using the at least two frequency tones is a direct up-conversion of the baseband signal to radio frequency, wherein the at least two frequency tones are radio frequency tones, and wherein the frequency offset of the at least two frequency signals equals the frequency offset of the at least two radio frequency tones.

5. The method for interference rejection in a communication system as claimed in claim 4, wherein in the transmitter, the direct up-conversion of the baseband signal to radio frequency comprises:
   generating at least two radio frequency tones including a first radio frequency tone and a second radio frequency tone;
   up-converting the baseband signal using the first radio frequency tone and the second radio frequency tone, thereby generating at least two radio frequency signals; and
   adding the at least two radio frequency signals, thereby generating the radio signal to be transmitted.

6. The method for interference rejection in a communication system according to claim 2, wherein in the transmitter, the up-converting of the baseband signal using at least two frequency tones is an indirect up-conversion of the baseband signal to radio frequency, wherein one of the at least two frequency tones is an intermediate frequency tone and the other is a radio frequency tone, and wherein the frequency offset of the at least two frequency signals equals twice the frequency of the intermediate frequency tone.

7. The method for interference rejection in a communication system as claimed in claim 6, wherein in the transmitter, the indirect up-conversion of the baseband signal to radio frequency comprises:
   generating at least one intermediate frequency tone;
   up-converting the baseband signal using the at least one intermediate frequency tone, thereby generating at least one intermediate frequency signal;
   generating a radio frequency tone; and
   up-converting the at least one intermediate frequency signal using the radio frequency tone, thereby generating the radio signal to be transmitted comprising at least two radio frequency signals.

8. The method for interference rejection in a communication system as claimed in claim 7, wherein the up-converting of the baseband signal using the at least one intermediate frequency tone is performed in digital domain.

9. The method for interference rejection in a communication system according to claim 2, wherein in the receiver, the down-converting of the signal provided by the envelope detector using at least one frequency tone is an indirect down-conversion of the signal to baseband frequency, wherein the at least one frequency tone is an intermediate frequency tone.

10. The method for interference rejection in a communication system as claimed in claim 9, wherein in the receiver, the indirect down-conversion of the signal provided by the envelope detector to baseband frequency comprises:
    generating at least one intermediate frequency tone; and
    down-converting the signal provided by the envelope detector using the at least one intermediate frequency tone, thereby extracting the baseband signal.

11. The method for interference rejection in a communication system as claimed in claim 9, wherein in the receiver, the down-conversion of the signal provided by the envelope detector to baseband frequency comprises digitizing the signal provided by the envelope detector and down-converting the digitized signal to a digital baseband signal.

12. A communication system comprising a transmitter and the receiver of claim 1, the transmitter comprising:
    an up-converting stage configured to up-convert a baseband signal to a radio signal to be transmitted, the up-converting stage comprising at least two up-conversion modules configured to up-convert the baseband signal with at least two frequency tones, thereby producing a radio signal to be transmitted comprising at least two frequency signals.

13. The communication system as claimed in claim 12, wherein the up-converting stage performs a direct up-conversion of the baseband signal to radio frequency, wherein the up-converting stage comprises:
   the at least two up-conversion modules arranged in parallel, wherein each of the at least two up-conversion modules comprising:
      a radio frequency generator for generating a radio frequency tone; and
      an up-converting unit for up-converting the baseband signal with the radio frequency tone, thereby generating a radio frequency signal; and
   an adder unit configured to add the generated radio frequency signals of the at least two up-conversion modules to form the radio signal to be transmitted.

14. The communication system as claimed in claim 12, wherein the up-converting stage performs an indirect up-conversion of the baseband signal to radio frequency, wherein the up-converting stage comprises:
   the at least two up-conversion modules arranged in series, wherein one of the at least two up-conversion modules is an intermediate up-conversion module comprising:
      an intermediate frequency generator configured to generate an intermediate frequency tone; and
      an up-converting unit configured to up-convert the baseband signal with the intermediate frequency tone, thereby generating an intermediate frequency signal;
   and the other is a final up-conversion module comprising:
      a radio frequency generator, for generating a radio frequency tone; and
      a final up-converting unit configured to further up-convert the intermediate frequency signal to the radio signal to be transmitted comprising at least two radio frequency signals.

15. The communication system as claimed in claim 12, wherein the up-converting stage performs an indirect up-conversion of the baseband signal to radio frequency, the up-converting stage comprises the at least two up-conversion modules arranged in series, wherein one of the at least two up-conversion modules is a digital intermediate up-conversion module, and wherein the other up-conversion module is a final up-conversion module, comprising:
   an radio frequency generator configured to generate a radio frequency tone; and
   an amplifier configured to receive the radio frequency tone at a first input and to receive the digital intermediate frequency signal at a second input, thereby generating the radio signal to be transmitted comprising at least two radio frequency signals.

16. The receiver as claimed in claim 1, wherein the down-converting stage performs an indirect down-conversion for further down-converting the signal provided by the envelope detector to a baseband signal, wherein the down-converting stage comprises:
   the at least one intermediate down-conversion module arranged in series with the envelope detector and comprising:
      an intermediate frequency generator configured to generate an intermediate frequency tone, the intermediate frequency tone being related to the at least two frequency tones;
      a down-converting unit configured to down-convert the signal provided by the envelope detector with the intermediate frequency tone, and thereby extracting the baseband signal; and
      a filtering unit configured to discard interference.

17. The receiver as claimed in claim 1, wherein the at least one intermediate down-conversion module is a digital down-conversion module configured to digitize the signal provided by the envelope detector and generating a digital baseband signal.

* * * * *

UNITED STATES PATENT AND TRADEMARK OFFICE
CERTIFICATE OF CORRECTION

PATENT NO. : 9,037,107 B2
APPLICATION NO. : 13/679975
DATED : May 19, 2015
INVENTOR(S) : Huang et al.

Page 1 of 1

It is certified that error appears in the above-identified patent and that said Letters Patent is hereby corrected as shown below:

Title Page 1 (item 54, Title) at line 3, change "THEROF" to --THEREOF--.

Specification

In column 1 at line 3, change "THEROF" to --THEREOF--.

In column 11 at line 40, change "$(\omega_{LO}-\omega_{IF,TX})$" to --$(\omega_{LO}+\omega_{IF,TX})$--.

In column 13 at line 35, change "$(\omega_{IFLO2}+\omega_{IF1})$" to --$(\omega_{IFLO2}+\omega_{IF1})$,--.

In column 14 at line 8, change "at as" to --at $2.\omega_{IF1}$, as--.

Signed and Sealed this
Twenty-ninth Day of March, 2016

Michelle K. Lee
*Director of the United States Patent and Trademark Office*